United States Patent [19]
Somerville et al.

[11] 3,809,480
[45] May 7, 1974

[54] METHOD AND APPARATUS FOR SURVEYING THE VELOCITIES OF A FLOW FIELD

[75] Inventors: Alvis J. Somerville; Edwin K. Yager, both of San Diego, Calif.

[73] Assignee: General Dynamics Corporation, San Diego, Calif.

[22] Filed: July 24, 1972

[21] Appl. No.: 274,143

[52] U.S. Cl.................... 356/103, 356/106, 356/28
[51] Int. Cl...... G01n 21/00, G01b 9/02, G01p 3/36
[58] Field of Search.......................... 356/106–113, 356/27, 28; 350/3.5

[56] References Cited
UNITED STATES PATENTS
3,548,655  12/1970  Rudd ................................ 356/106
3,636,249  1/1972  Larsen ............................... 350/3.5

*Primary Examiner*—Ronald L. Wibert
*Assistant Examiner*—Conrad Clark
*Attorney, Agent, or Firm*—Hugo F. Mohrlock

[57] ABSTRACT

A technique of flow visualization employing a laser to generate a sheet of light and at least one beam of light, wherein the beam of light is caused to scan or sweep the sheet of light. Receiving optics and one or more photo detectors monitor the interaction and provide as output as a function of the velocity of particulate matter present in the area of intersection of the light beams, thereby generating a velocity picture of the scanned area which may be processed and stored or presented on a cathode ray tube or other display device.

8 Claims, 10 Drawing Figures

METHOD AND APPARATUS FOR SURVEYING THE VELOCITIES OF A FLOW FIELD

BACKGROUND OF THE INVENTION

The measurement of fluid flow, either liquid or gas, has developed over the years into a sophisticated art, wherein many devices have been developed and improved to accomplish such measurement. Early measurements were accomplished by utilizing manometers to measure pressure drop of the flow through a venturi section and thereby establish certain characteristics of the mass flow.

In the design of aircraft and aerospace vehicles aerodynamic problems are often solved using wind tunnels. When utilizing wind tunnels, it is frequently important to know the speed of fluid flowing in the tunnel at preselected points. Flows immediately adjacent to the vehicle model may be measured by utilizing pressure pickups mounted flush in the model surface at the desired location and comparing the sensed pressure with the known dynamic pressure of the free stream fluid flow. For other preselected points devices which have previously been utilized include pitot tubes, vanes, hot wire anemometers, heat flux transducers, and tufts. These devices have some serious disadvantages. All require being physically located in the flow at the point where measurement is desired, and consequently distort the local flow and alter the true velocity. Secondly, the devices are subject to damage by any hostile environment such as hith pressures and high temperatures.

With the advent of highly coherent light from lasers, velocity measurement in a flow field became possible without affecting or disturbing the flow field. The physical principle which underlies the operation of a laser velocimeter is that the wave length of light scattered from a moving object is modified by the motion of that object and the frequency of the light is shifted in a manner equivalent to the Doppler effect. Suspending particles, such as powder, or smoke, or droplets of some liquid such as atomized silicone oil, in the flow fluid will provide the moving particles for reflecting or scattering the light beam as they move across the focal point of a lens illuminated by the light beam. The particles must be sufficiently small that they are suspended in the field and truly move at the velocity and in the direction of the fluid flow. The particles must also be of sufficient size and/or quantity to scatter a sufficient proportion of the incident light, or alternatively a large receiving lens must be used and a wide scattering angle employed to collect a sufficient amount of scattered light. A typical laser velocimeter based on this principle focuses an unscattered coherent reference light beam and the scattered or reflected light on a photo multiplier tube and the non-linear action of the photo multiplier results in a hetrodyning action which produces an electrical output, the frequency of which is the difference between the frequencies of the two light sources. This frequency shift is directly proportional to the velocity of the suspended particles along the optical axis of the viewing photo multiplier and its detection is processed electronically to produce an electrical signal which is converted into a velocity display, such as a sinusoidal wave on an oscilloscope, a side band on a spectrum analyzer, or converted to a direct electrical signal. This type of laser velocimeter is generally referred to as a "reference beam" velocimeter. An improvement in this technique permits measurements to be made in three dimensions by providing three independent receiving systems that are all focused from different directions on the same scattering volume illuminated by the coherent beams. Each of the Doppler-shifted, or scattered, beams is coherently mixed with a portion of the reference beam which has not been Doppler shifted to obtain the velocity in three dimensions which thereby permits determination of the true velocity vector. It should be noted that in these reference beam systems, the Doppler shift measured is a function of the direction of light collection.

Another method of fluid velocity detection, generally referred to as "crossed beam" velocimeter, employs two unscattered coherent laser beams which are caused to intersect at a predetermined point of interest in the flow field, whereupon the two beams produce a sinusoidal "fringe" pattern at this point of intersection. A particle passing through this fringe pattern will produce a sinusoidal variation in the amount of light scattered as it passes through the light and dark crests of the fringe pattern. The theoretical description of such a crossed beam fringe pattern is described later herein. Particles passing through the intersection of crossed laser beams produce a Doppler difference frequency which is independent of the viewing direction.

Thus it can be seen that laser velocimeters are very useful in a method of measuring fluid velocity at preselected points which avoids inserting a probe into the flow field. Such velocimeters are limited however to reading the local velocity in a finite area, i.e., the focal point of the reference beam velocimeter optics, or the point of intersection of the crossed beam velocimeter. To move this point requires precision adjustments of the laser beams and/or the receiving optics, which are time-consuming and which result in testing of many trial and error setups to survey a flow field and determine the point or points of critical concern for more detailed tunnel testing.

The magnitude of this problem may be more clearly appreciated if one understand that these laser beams are approximately 1 to 2 millimeters in diameter. The precision alignment of these beams so that they illuminate the desired finite area or cross at the desired point is indeed a difficult task, and once alignment is obtained the alignment may be lost by any change in the refraction index of the flow field medium, such as for example a change locally or generally in the density of the flow medium. This is particularly true in the case of transonic and supersonic air flows where sharp density changes exist when shock waves are developed.

Another condition which complicates beam alignment is encountered whenever it is desired to move the beam to a new finite area of interest (the focal point of a reference beam velocimeter or the intersection point of a crossed beam velocimeter), since any change in the angle of incidence of the beams with the tunnel window or flow medium will change the beam refraction.

SUMMARY OF THE INVENTION

The present invention is properly described as a "field velocimeter," or "scanning velocimeter," that is, it measures flow velocities in a given area or volume, as opposed to the previously described velocimeters which measure the flow at a particular point. Additionally, the present invention differs from reference beam velocimeters in that the velocity vector detected is independent of the direction in which the scattered light is collected and detected, as will later be described herein. The present invention utilizes a technique which simultaneously illuminates moving particles suspended in a flow from different directions as the particles pass through the intersection of scanning laser beams. At the intersection of the laser beams an interference pattern of fringes is formed and the fringes are spaced apart in the direction of the velocity component desired to be measured. The resultant fluctuation in the amount of fringe pattern light scattered by the moving particles is detected by a photo detector and the velocity of the particle determined as a function of the frequency of the fluctuations.

It is an object of the present invention to provide a crossed beam velocimeter which eliminates the alignment problems previously described.

It is an object of the present invention to provide a crossed beam velocimeter in which the beams will continue to intersect when transient or steady state density changes occur in the flow medium.

It is an object of the present invention to provide a velocimeter wherein intersection of two or more laser beams will continue to occur when adjustments or changes in alignment or changes in refractions occur in one or more beams.

Another object of the invention is to provide a velocimeter in which one or more laser beams may be scanned, swept, or otherwise translated while maintaining intersection with one or more other beams.

Another object of the invention is to provide a velocimeter in which one or more crossed beam interference areas are scanned, swept, or otherwise translated within a predetermined area or volume.

Another object of the present invention is to measure the velocity of moving solids, liquids, or gases throughout a desired area or volume without disturbing the flow pattern or the velocity being detected.

Another object of the invention is to measure the flow velocity along any predetermined direction throughout a desired cross-section of the flow field or any portion thereof.

Another object of the invention is to present a velocity picture of a preselected cross-section or plane of the flow field in which local velocity variations in the viewed field are presented simultaneously.

Another object of the invention is to simultaneously measure a wide range of velocities from subsonic to supersonic in a flow field.

Another object of the invention us to provide a method or presenting a cross-section velocity picture of a fluid flow field which is independent of the physical properties of the fluid.

Another object of the invention is to measure the velocities of a flow field in a manner which is independent of the direction in which the scattered light is collected or detected.

Another object of the invention is to measure fluid flows containing extremely small suspended particles and/or low particle density.

The above objects and others are accomplished by the present invention by utilizing a new and novel laser optical system wherein a sheet of laser light is scanned or swept by a laser beam to produce a moving area of intersection of the two lights, and receiving optics and photo detector for monitoring the interactions and providing an output, as a function of the fluid velocity at the point of intersection of the sheet of light and the laser beams, which may be processed and recorded or displayed in a manner analogous to a television display.

DETAILED DESCRIPTION OF THE INVENTION

Figure 1:
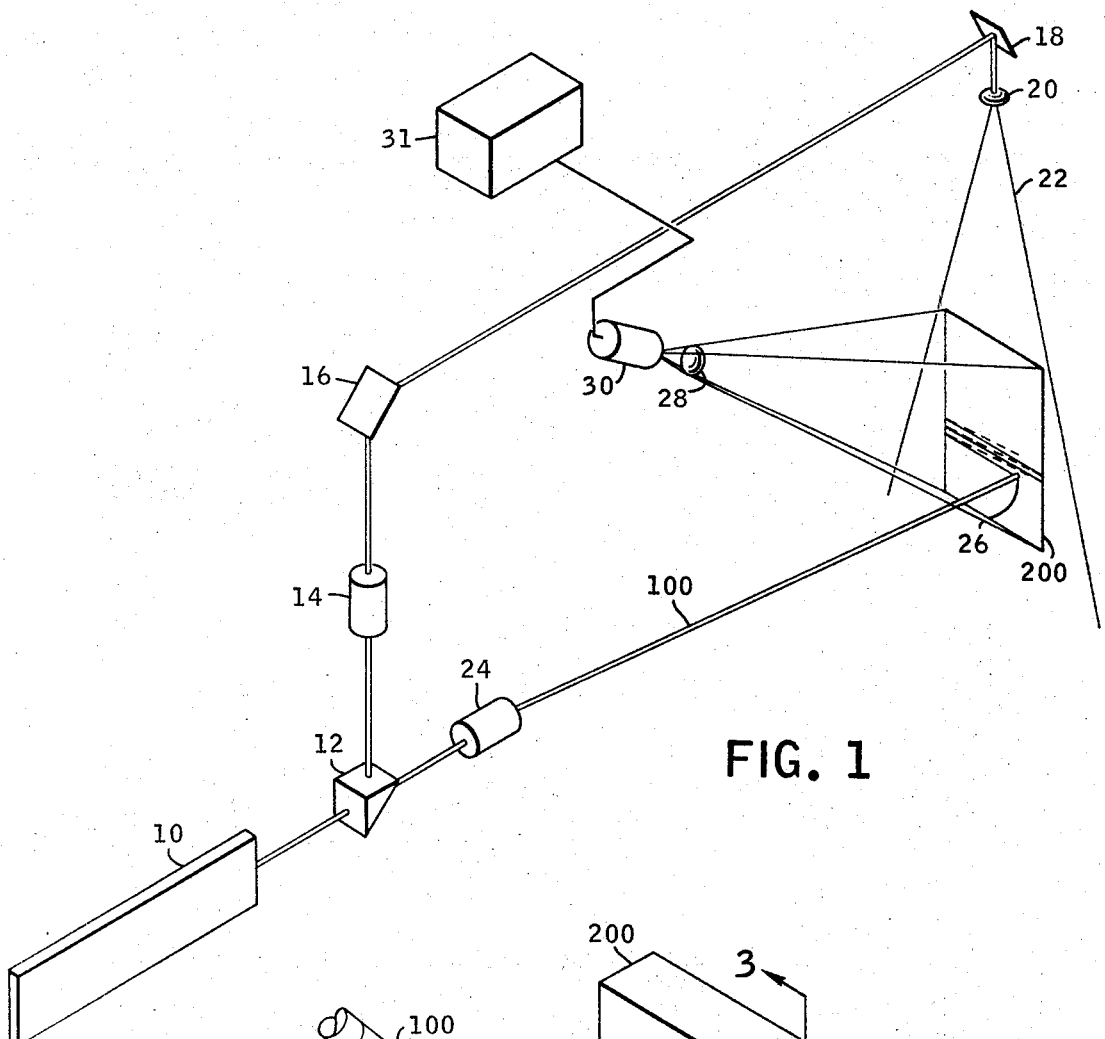
FIG. 1 is a schematic diagram of a simple laser field velocimeter.

Referring now to the drawings in detail, FIG. 1 is a schematic diagram of a simple laser field velocimeter. Light from a laser source 10 is directed to a beam splitter 12 where a first portion of the light is reflected to a polarization rotator 14 and subsequently transmitted to mirrors 16 and 18, whereupon the light is directed through an anamorphic lend 20. Any suitable anamorphic lens may be used to produce the desired curved or flat sheet of light, such as for example a cylindrical lens to produce a flat sheet of light. Lens 20 spreads the beam into a sheet of light 22 which is a monochromatic polarized beam of laser light, shown for convenience as a flat beam in FIG. 1.

A second portion of the light from beam splitter 12 is transmitted to a scanner 24 wherein the light is directed toward the flat beam 22 and intersects the flat beam 22 at point 26. The scanner 24 sweeps the point 26 back and forth in a horizontal or vertical direction across a preselected area 200 of the flat beam 22. In another embodiment of the invention, the scanner 24 moves the point 26 in a spiral path to define a circular area on the flat beam 22. Receiving optics, comprising lens 28 and photo detector 30, monitor the preselected area 200 to record fluctuations and changes in the scattered light. Any suitable photo detector may be used, such as for example a detector which converts received radiant energy into an electrical output. Typical detectors of this type include photo multiplier tubes which convert received radiant energy to an electrical signal which is subsequently demodulated by frequency to voltage conversion and the voltages are displayed in any suitable manner by the converter-display unit 31. The manner in which this device may be utilized to detect velocity will hereinafter be described.

The theory of operation of these intersecting beams will be presented by a fringe formation explanation which is easily described graphically and readily provides a basic understanding of the invention, and additionally, an understanding of performance parameters and characteristics of the present invention will evolve from such an explanation, it being recognized that other descriptions of the theory of operation are equally valid.

Figure 2:
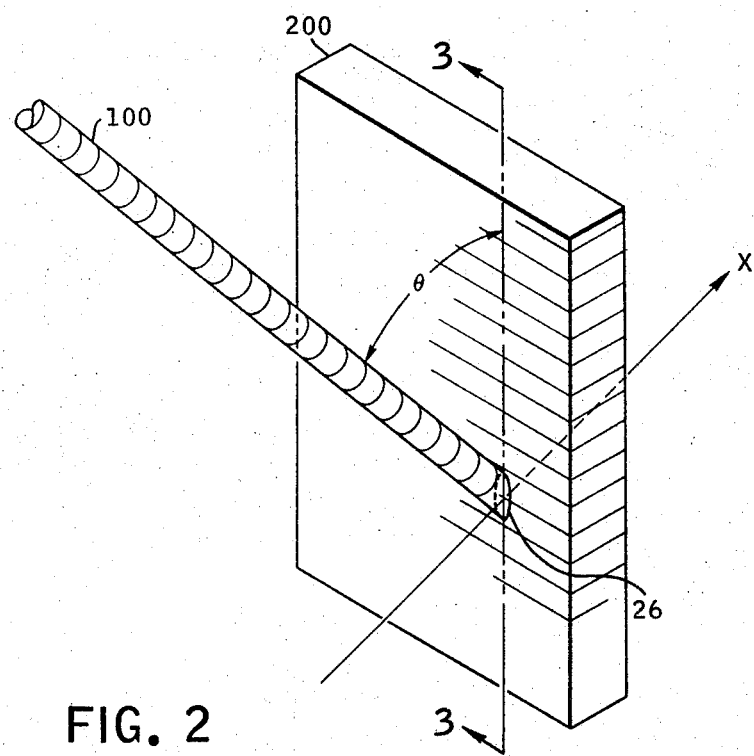
FIG. 2 is an enlarged view of the two intersecting laser beams of FIG. 1.
Figure 3:
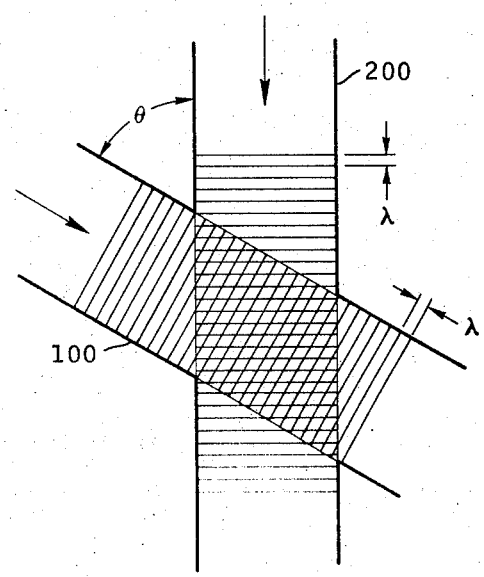
FIG. 3 is a cross-section taken along line 3—3 of FIG. 2, at the point of intersection of the two laser beams.
Figure 4:
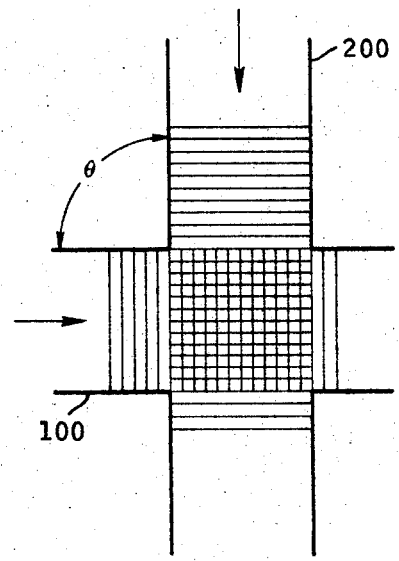
FIG. 4 is a cross-section of two laser beams intersecting at 90°.
Figure 5:
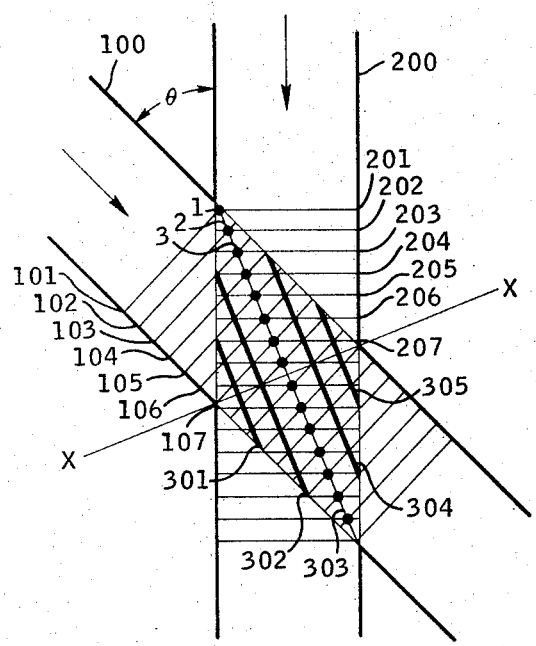
FIGS. 5 and 6 illustrate the fringe patterns formed by the interference of light waves at the intersection of two laser beams.

FIG. 2 is an enlarged view of cylindrical laser beam 100 and the scanned area 200 of flat laser beam 22. Beam area 200 is disposed in a flow field comprising liquid, or gas, and/or solid matter, wherein it is desired to determine the velocity component in the direction illustrated by line x—x. The laser beams 100 and 200 intersect at area 26 and FIG. 3 is a sectional view through the intersection 26 along line 3—3 of FIG. 2 in such a manner as to contain both beams in a common plane. If area 200 is a small portion of the flat beam 22, the light therein may be considered to be a collimated flat beam of monochromatic polarized light. Equally spaced lines in beams 100 and 200 in FIGS. 2 and 3 depict planar phase fronts or wave crests in the beams and are spaced apart one wave length $\lambda$. It will be seen in FIG. 3, where the planar wave crests appear as edges perpendicular to their beam centerlines such that each adjacent crest is separated from the next by the wavelength $\lambda$, that these wave crests form a diamond-shaped or parallelogram interference area in the cross-section. In a like manner in FIG. 4 it will be noted that when the cylindrical beam 100 is perpendicular to the flat beam 200 the interference area is square in cross-section. Since the two beams 100 and 200 have been oriented to be mutually coherent and identically polarized, they will interfere with one another in a constructive and destructive manner to establish a set of spaced, planar interference fringes in the interference area. FIG. 5 illustrates the manner in which these bright and dark interference fringes are formed. Again, the wave crests of each beam are, as in FIGS. 3 and 4, shown as lines perpendicular to the beam centerlines, such that adjacent crests are separated by the wavelength $\lambda$. Planar wave crests 201 through 207 in flat beam 200, traveling at the speed of light in the direction indicated by the arrow within beam 200 and parallel to the beam centerline, remain in phase with and reinforce wave crests 101 through 107 in round beam 100. This may be visualized if we assume two wave crests are positioned at 101 and 201 simultaneously. These two planar crests interfere at point 1. As the crests continuously move along to positions 102 and 202 respectively they interfere at point 2, and at positions 103 and 203 interfere at point 3, and so on continuously through the interference area, the locus of these points forming a line of interference as the planar wave crests move through the interference area. At each point of interference the wave crests of the two beams form similar lines of interference parallel to each other, such as 301, 302, 304 and 305 which are planes viewed on edge and are planes of peak illumination, or bright fringes, all being parallel to the bisector of the beam interference angle $\theta$. At intermediate points between the bright fringes, the waves of the two beams are out of phase, a positive wave being cancelled by a negative wave, that is they are destructively interfering, forming planes of low illumination or dark fringes. Thus it may be seen that the interfering beams form a small interference "volume" comprising an alternating series of parallel planes of bright and dark illumination or light and dark interference fringes, and these fringes form an angle with the respective beam centerlines equal to $\theta/2$.

Figure 6:
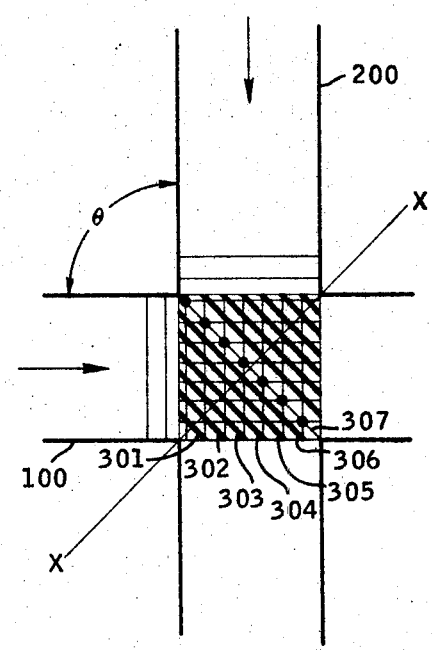

In FIGS. 5 and 6 a line x—x is drawn perpendicular to the fringes and the distance between fringes measured along line x—x may be expressed.

$$x = \lambda/2 \, \text{SIN} \, \theta/2$$

It is desirable that the fluid contain at least some particles suspended in the fluid so that a portion of the laser light is scattered by these particles. In many instances the fluid will contain a sufficient number of particles to make it unnecessary to further add any particles, but smoke, powder, atomized liquid droplets, or other particulate matter may be added to the fluid medium if required. Preferably the size of particles should be sufficiently small such that of the particles follow the medium flow path accurately and without affecting the flow pattern. As a moving particle passes through the beam interference volume, it will intercept the previously discussed interference fringes, and will be illuminated alternately from maximum to minimum to maximum, and will therefore alternately scatter and then not scatter, and then scatter light into the photo detector 30, FIG. 1. If a photo multiplier tube is used for a detector, the photo multiplier tube will generate a signal the frequency of which will be proportioned to the rate at which the particle intercepts the fringes, that is the particle velocity component which is oriented perpendicular to the interference fringes will be measured. Stated in terms of FIGS. 5 and 6, the velocimeter senses the velocity component that is parallel to line x—x. By knowing the spacing $x$ of the fringes and the scatter frequency $f$, the velocity is determined along line x—x as:

$$V_x = xf = \lambda f/2 \, \text{SIN} \, \theta/2$$

Thus, it may be seen that as cylindrical beam 100 is scanned across flat beam 200 by the scanner 24, a survey of flow velocities in the x—x direction at all interference volumes within the scanned volume may be detected and recorded, the direction of the velocity component, or line x—x, being established by the interference angle between the two beams as previously described.

Note that the detected signal frequency $f$ is independent of the direction in which scattered light is collected and detected by lens 28 and photo detector 30, FIG. 1. Thus, larger quantities of scattered light may be collected by increasing the collection angle of the viewing optics without altering the characteristic frequency of the received signal, as opposed to reference beam lasers where the collection angle of the viewing optics must be small so as to limit the frequency broadening effects, that is, to obtain only the scatter along the viewing axis. It is this fact which causes the crossed beam laser to be potentially more sensitive than a reference beam laser and therefore more useful for detecting higher velocity and/or lower particle density flows.

Figure 7:
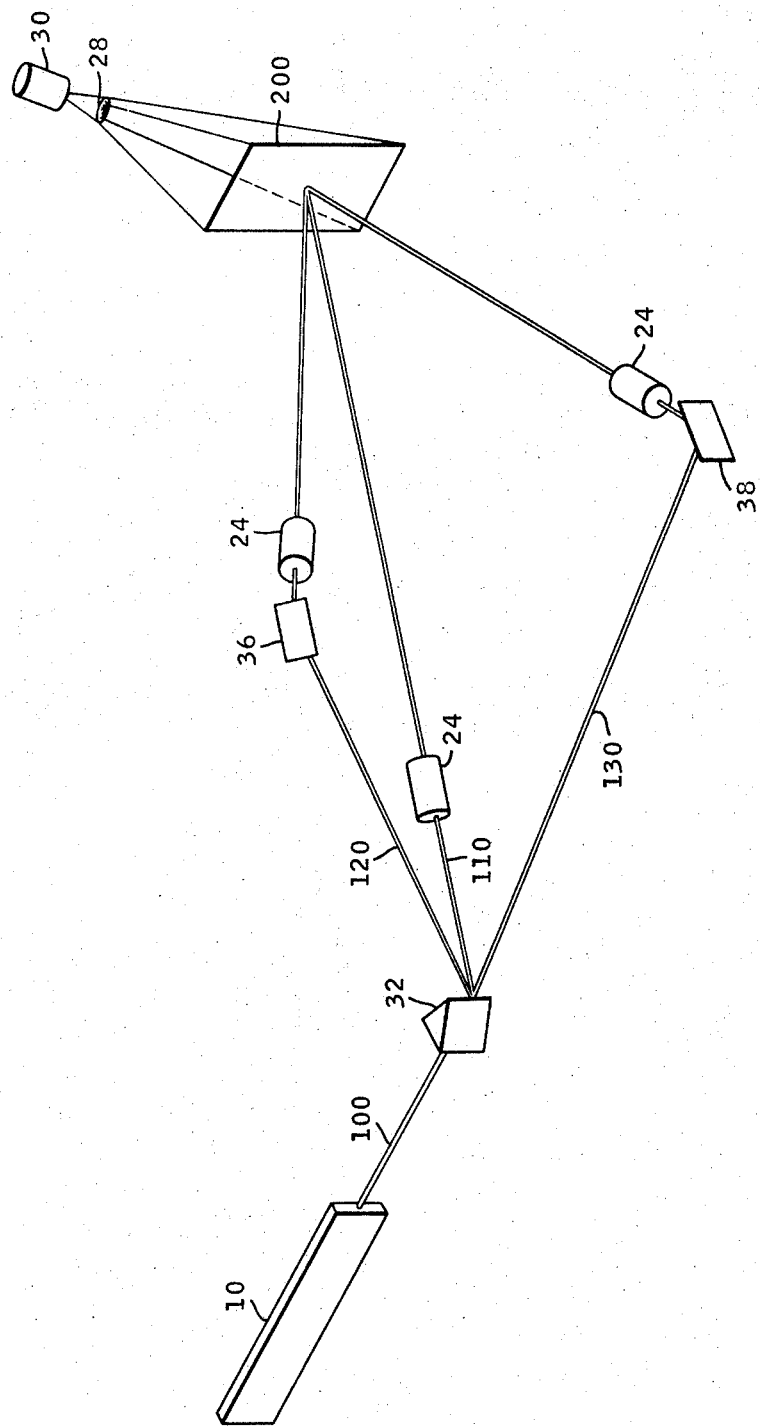
FIG. 7 is a schematic presentation of a multiple beam, single sheet velocimeter.

Referring to FIG. 7, we see a schematic presentation of a plurality of cylindrical beams from a common source intersecting a single sheet of light 200. The sheet 200 is formed from the common laser source 10 in the same manner as shown in FIG. 1, the necessary mirrors and lenses being omitted for clarity. For convenience three cylindrical beams 110, 120, and 130 are shown intersecting sheet 200 in order to obtain velocity components in three directions, it being realized that more or less beams may be utilized. A light beam 100 from a laser source 10 is directed to a beam splitter 32 where a first portion, beam 110, is reflected to a scanner 24; a second portion, beam 120, is reflected to mirror 36 and subsequently transmitted to a scanner 24; and a third portion, beam 130, is reflected to mirror 38 and subsequently directed to a scanner 24. The three scanners 24 direct their respective beams to intersect flat beam 200 at predetermined angles. The three beams, 110, 120 and 130, are programmed to scan flat beam 200 in a predetermined sequence to time-share the scattering data to photo detector 30. Frequency measurements of velocity are made in three directions which may be displayed on three separate component vector displays or which may be processed to determine the resultant velocity vector and thereafter shown on a single display. Any suitable display may be used, the cathode ray tube being preferred in some cases in that a composite picture of the entire scattering volume illuminated by the coherent beam 200 may be simultaneously presented. Velocity may be presented as a function of light intensity, for example varying from black to white, or as a function of color varying from blue or violet to red, over the entire face of the cathode ray tube which corresponds to the scattering volume illuminated by beam 200. In other cases, the information is processed and stored or recorded by any suitable data processing method.

Figure 8:
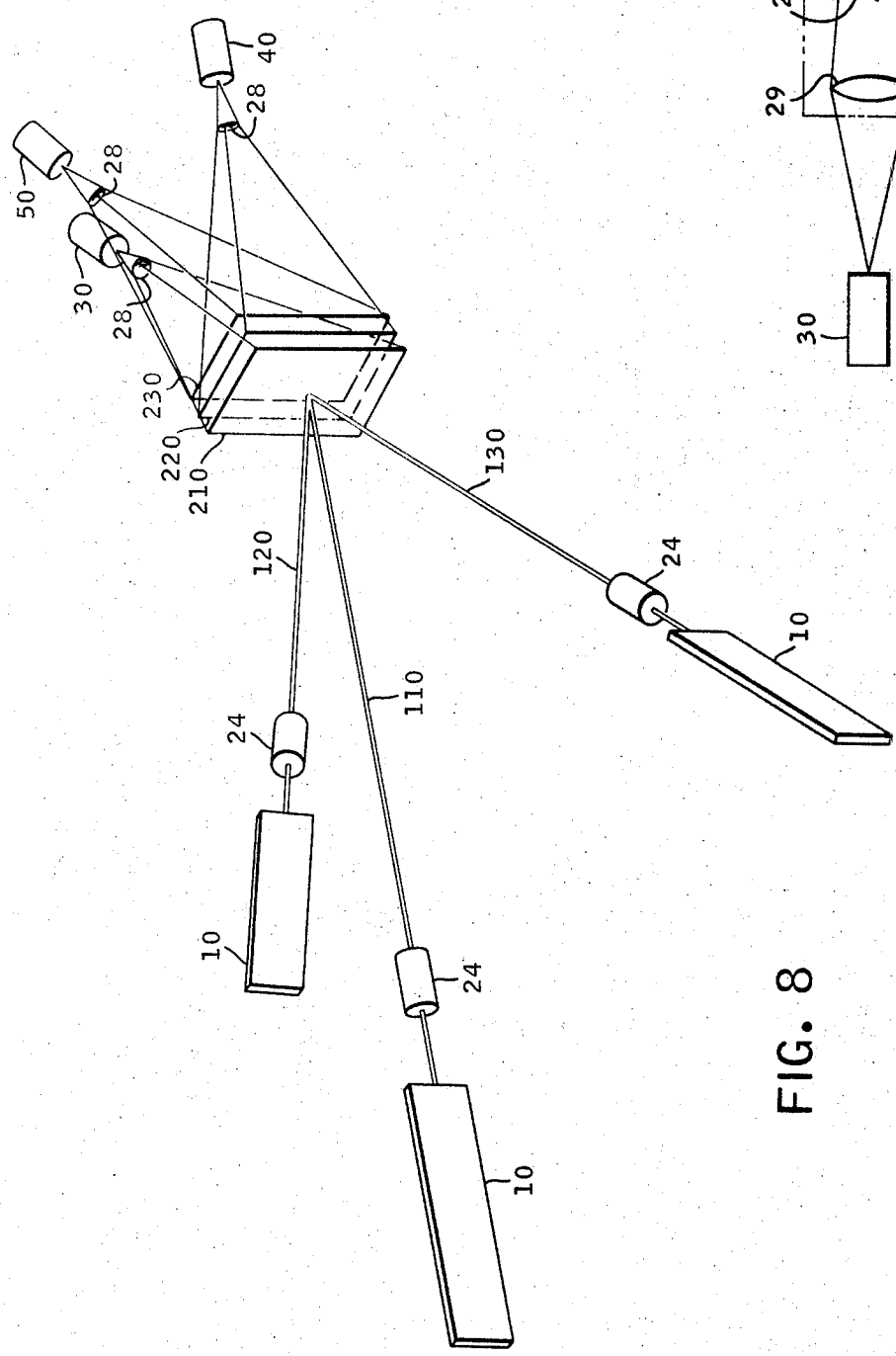
FIG. 8 is a schematic presentation of multiple beam, multiple sheet velocimeter.

FIG. 8 illustrates an embodiment wherein three cylindrical beams, 110, 120, and 130, of laser light intersect three flat or curved sheets of laser light, 210, 220, and 230; illustrated in FIG. 8 as flat sheets or beams. Each of the sheets of light 210, 220, and 230 are formed from their respective laser sources in the manner illustrated by FIG. 1, the necessary parts being omitted in FIG. 8 for clarity. The sheets of laser light 210, 220, and 230 may by use of suitable mirrors and lenses, be curved to parallel an airfoil or other curved surface, or the intersection of two surfaces such as an aircraft wing fillet, to measure air flows parallel to the surface. The three cylindrical laser beams, 110, 120, and 130, each are of a different frequency, and sheets 210, 220, and 230 are of matching frequencies such that sheet 210 and cylindrical beam 110 are at the same frequency, and sheet 220 and cylindrical beam 120 are at the same frequency, and sheet 230 and cylindrical beam 130 are at the same frequency. Measurements are made in three dimensions by providing three independent receiving systems, photo detector 30 being tuned or gated to receive scattering from sheet 210, photo detector 40 receiving scatter from sheet 220, and photo detector 50 receiving scatter from sheet 230. Means for tuning or gating of the photo detector to receive scatter from only one scanning interference fringe may be as simple as a spectral filter placed in front of each photo detector, or if one detector is utilized the scatter energy from a plurality of interference fringe volumes may be time shared by placing a rotating turret in front of the photo detector, wherein the turrent contains a plurality of spectral filters adapted to alternately transmit radiant energy from each of the respective fringe volumes. Additionally, time sharing a single photo detector may be accomplished by having only one pair of beams, as for example cylindrical beam 110 and sheet 210, radiating energy at any instant of time. Again, as previously described, the measurements may be processed, digitized and stored, or displayed on three separate displays or combined into a single display.

It should be noted that for clarity the three sheets of laser light 210, 220, and 230 are shown in FIG. 8 as being parallel and in close proximity one to another, whereas in fact the three sheets may occupy the same volume, or be at acute angles one to another, or be significantly displaced one from the other, or be curved sheets of laser light, without any degrading effect on the measuring functions of the systems, the positioning and plane form of the sheets as well as the intersection angles of the cylindrical beams being at the discretion of the operator to measure whatever shaped volume and velocity vector therein he desires. Further, in all figures herein where photo detectors are shown, it should be kept in mind that their locations are for the convenience of illustration, and they could be positioned anywhere in front or behind of the illuminated volume, since the scatter frequency of the detected light is independent of the direction in which it is collected. In a like manner, the cylindrical beam sources and scanners may be located anywhere convenient and cylindrical beams may intersect a sheet from the forward or back side of the sheet.

It will be recalled that one of the advantages of this crossed beam velocimeter is that a large collecting angle may be utilized in the viewing optics which permits collecting larger quantities of scattered light (signal strength) than is possible with other type laser velocimeters where the collection angle must be small in order to limit frequency broadening effects. Stated another way, this crossed beam velocimeter has the potential of a higher signal-to-noise ratio. Since, however, the field of vision of the receiving optics is sufficiently large to view the entire area of interest, such as area 200 of FIG. 7 as an example, there may be conditions under which an unsatisfactory amount of noise emanating from this large area may be received by the viewing optics. Under such conditions it would be desirable to reduce the field of vision while maintaining a large collection angle. This would require the viewing optics to scan the area of interest in synchronization with the scanning interference fringe area.

Figure 9:
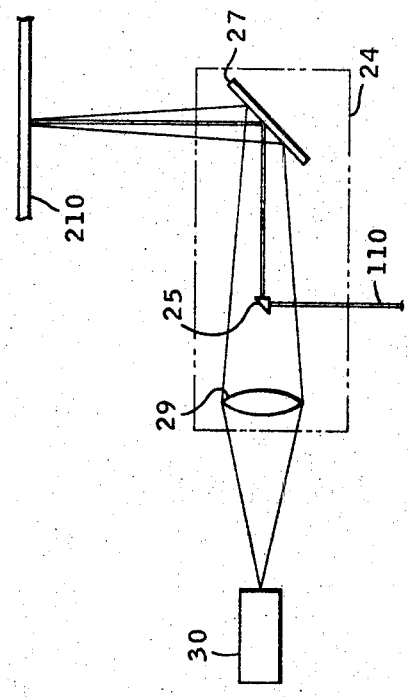
FIG. 9 is a schematic presentation of a dual purpose scanner.

FIG. 9 illustrates how this may be accomplished by adding an objective lens or mirror to the scanner 24 in a typical Schmit optic system so that the scanner performs the dual function of scanning the projected cylindrical beam while simultaneously collecting scattered energy. The cylindrical beam 110 is projected by prism 25 onto scanning mirror 27 which projects beam 110 into the flow field to intersect sheet 210. Scattered return radiation is returned to the scanning mirror 27 and subsequently sent to objective lens 29 which focuses the scattered radiation on photo detector 30. Scanning mirror 27 is oscillated about two mutually perpendicular axes to perform the scanning functions. If such a scanner and photo detector configuration is used in the velocimeter shown in FIG. 8, and if beams 110, 120, and 130 are spaced sufficiently apart in the scanning path, the tuning or gating means, previously described, for the photo detectors is not required.

Figure 10:
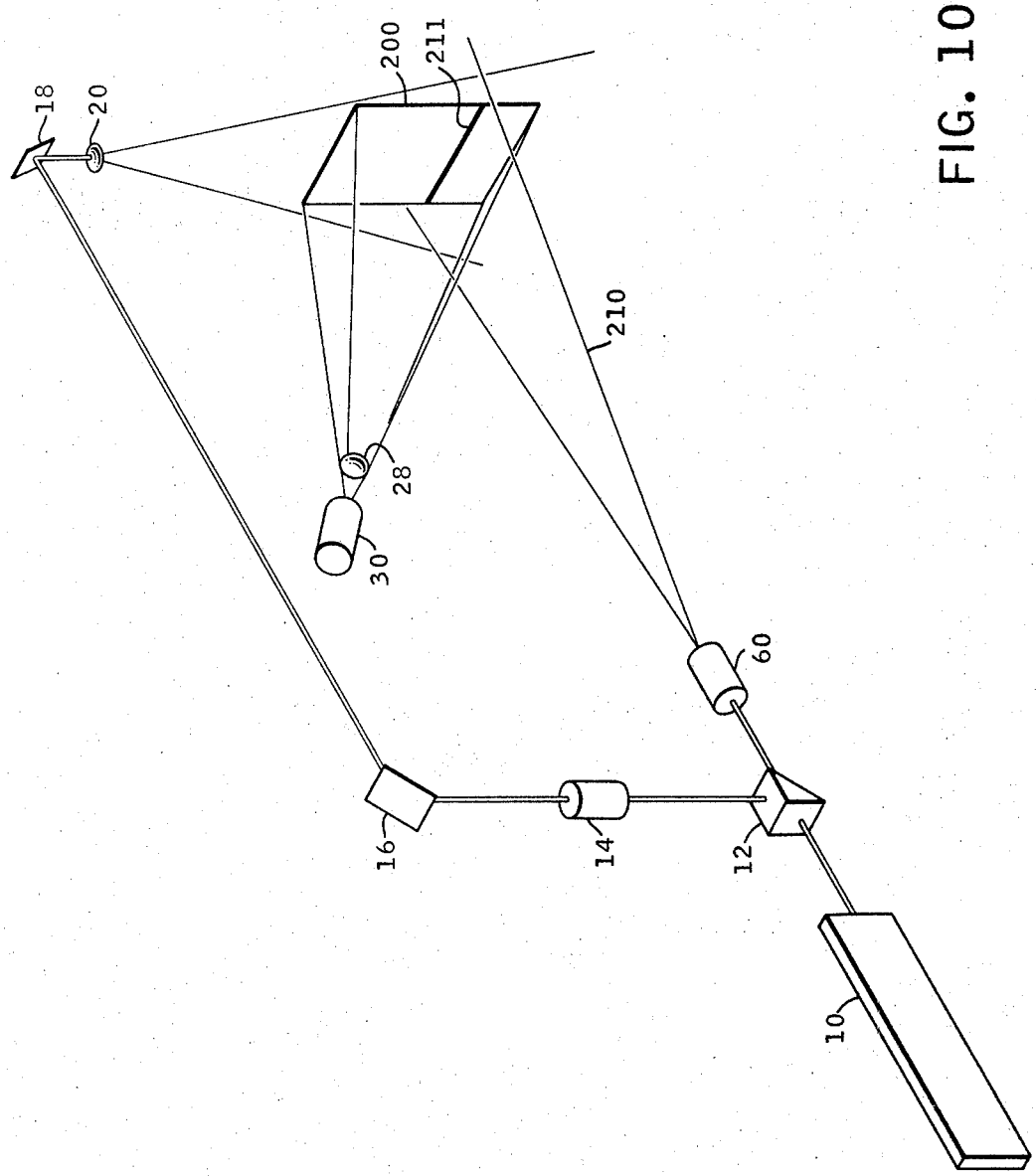
FIG. 10 is a schematic presentation of an intersecting light plane and sheet velocimeter.

FIG. 10 illustrates an embodiment wherein the moving cylindrical beam is replaced by a flat plane of light 210 which intersects sheet 200 to form a line of interference 211 for measuring the average velocity of flow within the line volume 211 along the $x$—$x$ direction, described earlier in FIGS. 5 and 6. As an example, the interference line 211 may be positioned parallel to a surface so that average velocities at varying distances from the surface may be measured. As illustrated in FIG. 10, the plane of light 210 is formed by sweeper 60, and the light plane 210 is swept up and down on laser sheet 200, thereby causing the interference line 211 to move up and down within the volume of interest. Light plane 210 may be rotated 90° so that the line 211 is vertical, and the light plane 210 caused to sweep horizontal, or any combination of light plane orientation and sweep direction intermediate thereto may be utilized. Again, it is to be remembered that either light sheet 200 or light plane 210 may be curved as required to define the desired volume. The crossed sheet — plane measurement made by the receiving system will be different than that measured in a crossed cylindrical beam — light sheet system, in that in the latter a multiplicity of spot scatter energies are detected while in the crossed light plane — light sheet system a multiplicity of line scatter energies are detected, and only the total energy of that line or the average energy of the line or some multiple thereof may be determined. While such information for certain conditions is highly desirable, such as flows over a curved airfoil section as an example, it is believed that the crossed cylinder — light sheet embodiments as exemplified in FIGS. 7 and 8 are utilized more often in classical flow measurement situation than is the plane-sheet crossed beams embodiment of FIG. 10. It should be clear from the foregoing that a multiplicity of planes of light and sheet of light and detector systems may be combined in the same manner as cylindrical beams and sheets of light and their associated detector systems were combined and exemplified in FIGS. 7 and 8 to obtain the desired measurements, and that a combination of cylindrical-sheet and plane-sheet crossed beams may be utilized in a single measurement system.

It should also be clear that the figures and description herein have been drawn to the basic principle of the invention and that additional or modified parts and structures may be utilized to increase optical path lengths, or equalize such path lengths, or change intersection angles, or alter the number of intersecting beams, or frequencies of laser light, as examples, and the invention is not to be restricted to the specific details, arrangement of parts, or number and shape of beams herein set forth, since various modifications may be effected without departing from the spirit and scope of this invention.

We claim:

1. A method for measuring flow velocities in a flow field comprising:
   directing at least one sheet of laser light into said flow field,
   directing at least one laser beam at each of said sheets of light to generate at least one fringe volume in each of said sheets of light, and
   detecting a portion of any scattered light emanating from each of said fringe volumes.

2. The method of claim 1 further comprising:
   moving at least one of said laser beams in a scanning motion to generate a scanning fringe volume.

3. The method of claim 1 further comprising:
   spreading at least one of said laser beams into a plane of laser light, and
   moving at least one of said planes of laser light in a sweeping motion to generate a sweeping fringe volume.

4. An apparatus for measuring velocities within a predetermined volume of a flow field comprising:
   source means for generating a beam of coherent monochromatic radiation,
   splitting means for dividing said beam into first and second split beams,
   anamorphic means for spreading said first split beam into a sheet of radiation and directing said sheet into said predetermined volume,
   projecting means for directing said second split beam toward said sheet of radiation to intersect said sheet of radiation and form a fringe volume, said fringe volume scattering light proportional to velocity of said flow field,
   detection means for collecting said scatter radiation from said fringe volume, and
   display means for converting said collected scatter radiation into a velocity measurement display.

5. The apparatus of claim 4 wherein said projecting means is adapted to scan said second beam over a portion of said sheet of radiation to form a scanning fringe volume.

6. The apparatus of claim 4 wherein said projecting means is adapted to spread said second beam into a plane of radiation.

7. The apparatus of claim 6 wherein said projecting means is further adapted to sweep said plane of radiation over a portion of said sheet of radiation to form a sweeping fringe volume.

8. An apparatus for measuring velocities within a flow field comprising:
   means for generating a plurality of beams of coherent radiation,
   means for spreading a first portion of each of said beans into respective sheets of radiation,
   means for projecting a second portion of each of said beams respectively toward said sheets of radiation to form at least one fringe volume in each of said sheets of radiation,
   means for scanning each of said fringe volumes within a portion of said sheets of radiation, and
   at least one photo detector focused on said scanning fringe volumes.

* * * * *